METHOD FOR PRODUCING METAL-TO-CERAMIC JUNCTIONS
Filed Sept. 15, 1969
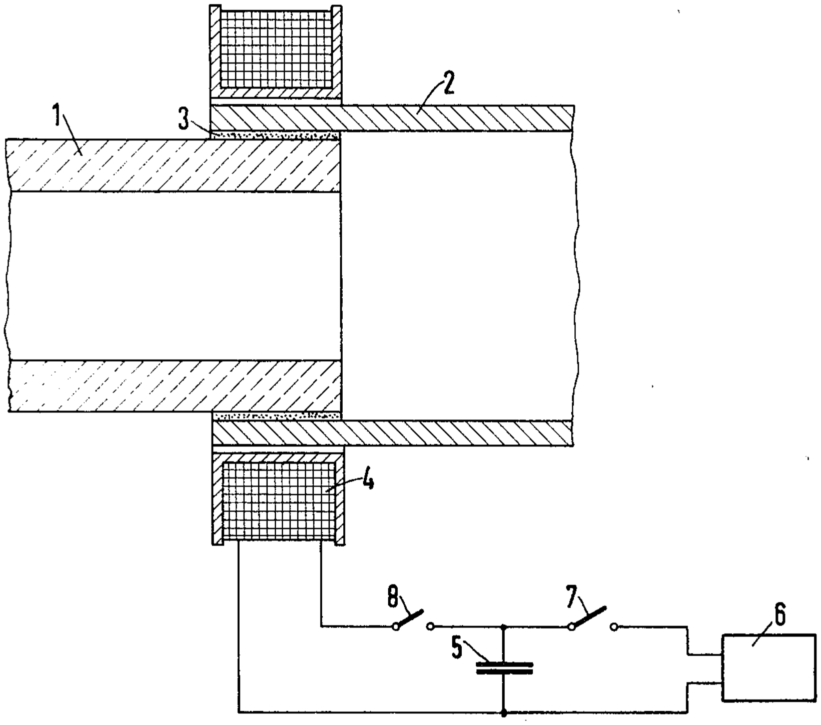

United States Patent Office 3,674,586

Patented July 4, 1972

3,674,586

METHOD FOR PRODUCING METAL-TO-CERAMIC JUNCTIONS

Hans Rimkus, deceased, late of Berlin, Germany, by Elsa Rimkus, sole heir, Berlin-Dahlem, Germany, assignor to Siemens Aktiengesellschaft, Berlin and Munich, Germany Continuation-in-part of application Ser. No. 501,846, Oct. 22, 1965. This application Sept. 15, 1969, Ser. No. 864,568

Claims priority, application Germany, Dec. 8, 1964, S 94,504

Int. Cl. B21d *21/06*

U.S. Cl. 156—196 5 Claims

ABSTRACT OF THE DISCLOSURE

Method for producing a metal-to-ceramic junction includes the steps of depositing an adhesive layer on a ceramic body on a surface portion thereof where the junction is to be made, and deforming the metal against the body at the location of the surface portion at a relatively high speed and with a relatively strong force.

This is a continuation-in-part of application Ser. No. 501,846, filed Oct. 22, 1965. The invention disclosed herein relates to methods for producing metal-to-ceramic junctions. More particularly, it relates to such methods for providing such junctions which are substantially torsion-proof.

It is well known that ceramic bodies tend to depart from prescribed dimensions. Such tendency frequently presents troublesome problems in the producing of metal-to-ceramic junctions. Such problems especially arise in cylindrical metal-to-ceramic junctions in which, generally, there are particularly high requirements for torsional strength.

It is an important object of this invention to provide a method of making metal-to-ceramic junctions, particularly cylindrical junctions which are torsion-proof.

This object is achieved by first depositing an adhesive layer on the ceramic or metallic portion surface which is to be joined. Thereafter, the metallic portion is effectively forced onto the ceramic through the employment of a high-speed high-capacity forming method. A suitable high-speed high-capacity forming method may be the hydrospark method, the explosive forming method or the magnetic forming method as disclosed in U.S. Pat. 2,976,-907 to G. W. Harvey et al. for "Metal Forming Device and Method," issued Mar. 28, 1961 and assigned to the General Dynamics Corporation. The adhesive used has to possess adequate shearing strength, a suitable adhesive for the junction being, for example, an epoxy resin. After the metal portion is forced onto the ceramic body, the adhesive is hardened whereby a liquid-tight and even gas-tight metal-to-ceramic of high torsional strength is produced. If the junction so produced is to be utilized in situations where it may be subjected to particularly strong stresses, the glazing of that portion of the ceramic surface where the adhesive layer is applied may be dispensed with.

In some instances, the adhesive layer has to be protected from corrosive liquids or gases. For these situations, one or more protective coatings of a corrosive liquid or gas resistant material may be provided on the adhesive layer, a suitable protective material for this purpose being a silicone rubber, for example. Such protective coatings function to seal off or shield the adhesive layer from the corrosive effects of the aforementioned gases and liquids.

The magnetic forming process can be particularly advantageously utilized for forcing the metal portion onto the ceramic body. In the employment of high pulsating magnetic fields according to the magnetic forming process as disclosed in the hereinabove mentioned U.S. Pat. 2,976,-907, compression coils, expansion coils and flat coils may be used as the work coils therein. In this method, the discharge of a capacitor is applied to a work coil. The alternating current produced in such circuit, effectively an oscillatory circuit, produces in the work coil a varying magnetic field. The latter field in turn induces eddy currents in a metallic workpiece disposed inside the work coil. The force effect produced between the magnetic field and the eddy currents can be utilized to form the workpiece into a chosen configuration. With the magnetic forming method, pressures exceeding 1000 kp./cm.$^2$ and forming speeds greater than 100 m./sec. can be achieved.

With the employment of the magnetic forming method for producing torsion-proof metal-to-ceramic junctions, the configurations of the metal portions of these junctions are readily conformed to the ceramic body. Because of the pressure of the adhesive layer between the ceramic body and metal portion at the junction, in accordance with the invention, the applicable forming energy produced in the magnetic forming process may be limited to a relatively small value to make allowance for the relatively low strength of the ceramic body.

With the method according to the invention, the armoring of a ceramic cathode arrester, for example, can be produced which has a torsional strength greater than 500 (cm.·kp.).

Generally speaking and in accordance with the invention, there is provided a method for producing a metal-to-ceramic junction comprising depositing an adhesive layer on a ceramic body on its surface portion where a junction is to be made, and deforming the metal against the body at the location of the portion at a relatively high speed and with a relatively strong force to produce the junction.

For producing the metal-to-ceramic junction on a portion of the surface of a cylindrical ceramic body, an adhesive layer is deposited on the portion. A tube comprising the metal of the junction is fitted around the ceramic body at the location of the adhesive layer. The ceramic body-adhesive layer-metal tube arrangement is inserted into the interior of the compression, i.e., work coil of a magnetic forming apparatus and the work coil is pulsed to produce a pressure to deform the metal tube against the ceramic body at the jjunction surface portion with a high force and at a high speed to produce the metal-to-ceramic junction.

The foregoing and more specific objects of my invention will be apparent from and will be mentioned in the following description of a method for producing metal-to-ceramic junctions according to the invention taken in conjunction with the accompanying drawing.

In the drawing, the sole figure is a depiction of an arrangement, partly in cross section, for carrying out the method of the invention.

Referring now to the single figure of the drawing, a ceramic tube 1 has a layer 3 thereon of an adhesive, suitably an epoxy resin, at the location of its peripheral surface where a metal-to-ceramic junction is to be formed. A metal tube 2 which is to be joined in part to ceramic tube 1 at the area of adhesive layer 3 is positioned for such joining. The ceramic tube adhesive layer and metal tube arrangement are inserted into the interior of a compression coil 4 of a magnetic forming apparatus. An annular silicone rubber coating is provided on the surface of the adhesive layer 3 facing the interior of the metal tube 2 to protect the adhesive layer from the corrosive effects of a corrosive liquid or gas flowing through the tube 2.

A strong voltage source 6 may be applied to a parallel connected capacitor 5 by the closing of a switch 7 to charge it and capacitor 5 can be discharged through compression, i.e. work coil 4 by the closing of a switch 8.

Upon the discharge of capacitor 5 into work coil 4 through closed switch 8, a strong magnetic field pulse is produced in work coil 4 which induces eddy currents on the periphery of metal tube 2 in the portion of tube 2 contained within work coil 4. The resulting high pulse of pressure produced from these phenomena deforms metal tube 2 against ceramic tube 1 with great force at a high velocity to produce the strong torsion-proof metal-to-ceramic junction.

In an example of the method of the invention, the ceramic tube 1 was made of vitrified porcelain having a wall thickness of 5–6 mm. The metal covering tube 2 was made of brass about 1 mm. thick. The adhesive 3 was an epoxy resin, namely 780 of Schering, Inc. and was mixed with a hardener Versamid 140. In other examples, adhesive bands were used as the adhesive layer. The coil 4 was a compression coil having an inductance of 1 $\mu$h., the capacitor 5 having a capacitance of 180 $\mu$f. and the voltage source 6 having a value of 8 kv.

It will be obvious to those skilled in the art upon studying this disclosure that methods for producing metal-to-ceramic junctions according to my invention permit of a great variety of modifications and hence can be given embodiments other than those particularly illustrated herein without departing from the essential features of my invention and within the scope of the claims annexed hereto.

I claim:

1. A method for producing a metal-to-ceramic junction comprising depositing an adhesive layer on a ceramic body on its surface portion where the junction is to be made, and deforming said metal against said body at the location of said portion in a high-speed forming operation selected from the group consisting of hydrospark, explosive forming, and magnetic forming operations and with a force having adequate strength to produce said junction.

2. A method for producing a metal-to-ceramic junction on a porttion of the surface of a cylindrical ceramic body, comprising depositing an adhesive layer on said portion, fitting a tube comprising said metal around said ceramic body at the location of said adhesive layer, disposing said ceramic body, adhesive layer, metal tube arrangement in the interior of a work coil of magnetic forming apparatus, and pulsing said work coil to produce a pressure to deform said metal tube against said ceramic body at said portion with a high force and at a high speed to produce said metal-to-ceramic junction.

3. A method as defined in claim 2 wherein there is utilized an epoxy resin for said adhesive layer.

4. A method as defined in claim 3 which includes applying at least one protective coating resistant to corrosive gases and corrosive liquids on an exposed surface of said adhesive layer.

5. A method as defined in claim 4 wherein said protective coating comprises a silicone rubber.

References Cited

UNITED STATES PATENTS

| | | | |
|---|---|---|---|
| 2,976,907 | 3/1961 | Harvey et al. | 72—56 |
| 3,202,540 | 8/1965 | Stare | 117—138.8 C |
| 3,297,622 | 1/1967 | Grosner et al. | 117—123 DX |
| 3,324,543 | 6/1967 | McVey et al. | 29—472.9 |
| 3,364,161 | 1/1968 | Nadler | 117—135.1 |
| 3,404,020 | 10/1968 | Woolley | 156—272 X |

OTHER REFERENCES

Polymer Progress, Shell Chemical Corporation, May 1955, pp. 1, 12, 13.

CARL D. QUARFORTH, Primary Examiner

E. E. LEHMANN, Assistant Examiner

U.S. Cl. X.R.

72—56; 156—272, 278, 294, 330